(12) United States Patent
Rivellini (10) Patent No.: US 11,104,432 B2
(45) Date of Patent: Aug. 31, 2021

(54) BENT TUBE DUCTED FAN DRONE

(71) Applicant: Stefano Rivellini, San Jose, CA (US)

(72) Inventor: Stefano Rivellini, San Jose, CA (US)

( * ) Notice: Subject to any disclaimer, the term of this patent is extended or adjusted under 35 U.S.C. 154(b) by 564 days.

(21) Appl. No.: 16/155,397

(22) Filed: Oct. 9, 2018

(65) Prior Publication Data

US 2020/0108920 A1    Apr. 9, 2020

(51) Int. Cl.
*B64C 39/02* (2006.01)
*B64C 29/00* (2006.01)

(52) U.S. Cl.
CPC ........ *B64C 29/0025* (2013.01); *B64C 39/024* (2013.01); *B64C 2201/108* (2013.01); *B64C 2201/162* (2013.01)

(58) Field of Classification Search
CPC .......... B64C 29/0025; B64C 2201/108; B64C 2201/162
See application file for complete search history.

(56) References Cited

U.S. PATENT DOCUMENTS

| | | |
|---|---|---|
| 2,730,311 A | 1/1956 | Doak |
| 2,807,428 A * | 9/1957 | Wibault ............... B64C 39/001 |
| | | 244/23 C |
| 2,879,014 A | 3/1959 | Smith et al. |
| 2,967,029 A | 1/1961 | Hill |
| 3,045,951 A * | 7/1962 | Freeland ............... B64C 39/001 |
| | | 244/23 C |
| 3,072,366 A | 1/1963 | Freeland |
| 3,107,071 A | 10/1963 | Wessels |
| 3,128,062 A | 4/1964 | Brocard |
| 3,184,183 A | 5/1965 | Piasecki |
| 3,262,657 A | 7/1966 | Anker-Holth |
| 3,299,637 A | 1/1967 | Santamaria et al. |
| 3,330,500 A | 7/1967 | Winborn |
| 3,410,507 A * | 11/1968 | Moller ................... B64C 39/06 |
| | | 244/23 C |

(Continued)

FOREIGN PATENT DOCUMENTS

| | | | |
|---|---|---|---|
| CN | 103238513 | 8/2013 | |
| GB | 759972 A * | 10/1956 | ......... B64C 29/0025 |
| WO | 9701481 | 1/1997 | |

OTHER PUBLICATIONS

International Search Report, PCT/US19/54490, dated Dec. 19, 2019.

*Primary Examiner* — Philip J Bonzell
(74) *Attorney, Agent, or Firm* — Lewellyn Law, PLLC; Stephen Lewellyn (57) ABSTRACT

A ducted fan drone has a plurality of bent tube propulsors that enshroud rotating fan blades in a manner the eliminates contact with the blades during operation, thereby allowing drone operation in confined areas without risk of injury to people, animals, objects, or the drone itself by incidental contact with the rotating fan blades. The bent tube propulsors have an air passage, an air inlet into the air passage, and an air exit out of the air passage. The air passage has an upwardly bent portion relative to a longitudinal axis of the ducted fan drone, a downwardly bent portion relative to the longitudinal axis, and horizontal section extending between the upwardly and downwardly bent portions. A fan propulsor is disposed within the air passage of each bent tube propulsor at a position along the horizontal section.

20 Claims, 10 Drawing Sheets

(56) References Cited

U.S. PATENT DOCUMENTS

| | | | |
|---|---|---|---|
| 3,640,489 A | | 2/1972 | Jaeger |
| 4,022,405 A | | 5/1977 | Peterson |
| 5,082,079 A | * | 1/1992 | Lissaman ................ B64C 27/20 |
| | | | 180/118 |
| 5,115,996 A | | 5/1992 | Moller |
| 5,769,317 A | | 6/1998 | Sokhey et al. |
| 6,547,180 B1 | | 4/2003 | Cassidy |
| 7,883,051 B2 | | 2/2011 | Sammy |
| 8,317,126 B2 | | 11/2012 | Harris et al. |
| 8,348,190 B2 | | 1/2013 | Fleming |
| 8,469,308 B2 | | 6/2013 | Robertson et al. |
| 8,876,038 B2 | | 11/2014 | Yoeli |
| 8,960,592 B1 | | 2/2015 | Windisch |
| 9,096,314 B2 | | 8/2015 | Brotherton-Ratcliffe et al. |
| 9,688,396 B2 | | 1/2017 | Avery, III |
| 9,809,304 B1 | | 11/2017 | Beckman et al. |
| 10,040,547 B1 | * | 8/2018 | Pedigo ................. B64C 29/005 |
| 10,336,452 B1 | * | 7/2019 | Jia ........................ B64C 39/024 |
| 2011/0215191 A1 | | 9/2011 | Gramling |
| 2016/0284002 A1 | | 9/2016 | Mullaney |
| 2016/0325834 A1 | * | 11/2016 | Foster ..................... B64C 27/20 |
| 2018/0037317 A1 | * | 2/2018 | Ichihara ................ B64C 39/024 |
| 2018/0093766 A1 | | 4/2018 | Ahn |
| 2019/0106204 A1 | * | 4/2019 | Konishi ................ B64C 39/024 |
| 2019/0127065 A1 | * | 5/2019 | Capunay ............. B64C 29/0075 |
| 2019/0291858 A1 | * | 9/2019 | Li ........................ B64C 39/024 |
| 2020/0036305 A1 | * | 1/2020 | John .................... G05D 1/0816 |

\* cited by examiner

BENT TUBE DUCTED FAN DRONE

FIELD OF THE INVENTION

The present disclosure generally relates to drones, and more particularly, relates to a ducted fan drone with bent tube propulsors that prevent contact with fan blades during operation.

BACKGROUND OF THE INVENTION

Drones are popular for military, industrial, and person use. They are used for video recording, surveillance, search and rescue, and sports, among a myriad of other uses. Operating drones can be dangerous because of exposed propellers or fan blades. These blades rotate with very high velocity and contact with them presents a significant danger of harm to people, animals, objects, and the drone itself. Operating drones in confined spaces increases risk of blade contact and the resulting harm or damage.

Despite this real danger, most drones operate with an open propeller or fan blade design. To reduce incidental contact with fan blades, some drones may have blade guards. Blade guards have a low-profile design that simply act like a bumper to prevent inadvertent contact with the rotating blade tips, which does not offer much vertical protection. Some drones may use blade guards with a mesh covering to prevent insertion of objects into the rotating blade. While adding mesh coverings works better than just guards alone, the mesh coverings greatly disrupt air flow and, as a result, are undesirable. Other drones may use ducted fans. A ducted fan has a shroud the extends slightly past the blade in opposite directions. The shroud is designed to make the fan more efficient and to partially enclose the blade. However, the shroud typically is very short compared to the diameter of the fan and has open ends that enable relatively easily contact with the fan blades and as such is still very dangerous.

Accordingly, there is a need and a desire for a new drone construction that significantly reduces the possibility of blade contact during operation to minimize danger of damaging or harming people, animals, surrounding objects, and the drone itself.

SUMMARY OF THE INVENTION

An object of embodiments of the invention is to provide a drone construction that eliminates the possibility of blade contact during drone operation.

Another object of embodiments of the invention is to provide a drone construction that allows drone operation within confined spaces such that incidental contact with surrounding objects does not cause loss of flight control.

Another object of embodiments of the invention is to provide a drone construction that prevents inadvertent bodily contact with blades while operating the drone.

In general, in one aspect, a ducted fan drone is provided that has a frame and at least three bent tube propulsors attached to the frame. Each bent tube propulsor has an air passage, an air inlet into the air passage, and an air exit out of the air passage. The air passage has an upwardly bent portion relative to a longitudinal axis of the ducted fan drone, a downwardly bent portion relative to the longitudinal axis, and horizontal section extending between the upwardly and downwardly bent portions. A fan propulsor is disposed within the air passage of each bent tube propulsor at a position along the horizontal section. The air exits of each bent tube propulsors are arranged to direct thrust force to the frame by directing the kinetic energy of the airstream generally downwards. The lift and thrust being controlled by adjusting relative speeds of each fan propulsor.

There has thus been outlined, rather broadly, the more important features of the invention in order that the detailed description thereof that follows may be better understood and in order that the present contribution to the art may be better appreciated.

Numerous objects, features, and advantages of the present invention will be apparent to those of ordinary skill in the art upon a reading of the following detailed description of the presently preferred, but nonetheless illustrative, embodiments of the present invention when taken in conjunction with the accompanying drawings. The invention is capable of other embodiments and of being practiced and carried out in various ways. Also, it is to be understood that the phraseology and terminology employed herein are for descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

For a better understanding of the invention, its operating advantages and the specific objects attained by its uses, reference should be had to the accompanying drawings and descriptive matter in which there are illustrated embodiments of the invention.

BRIEF DESCRIPTION OF THE DRAWINGS

The following drawings illustrate by way of example and are included to provide further understanding of the invention for illustrative discussion of the embodiments of the invention. No attempt is made to show structural details of the embodiments in more detail than is necessary for a fundamental understanding of the invention, the description taken with the drawings making apparent to those skilled in the art how the several forms of the invention may be embodied in practice. Identical reference numerals do not necessarily indicate an identical structure. Rather, the same reference numeral may be used to indicate a similar feature or a feature with similar functionality. In the drawings.

DETAILED DESCRIPTION OF THE INVENTION

Figure 1:
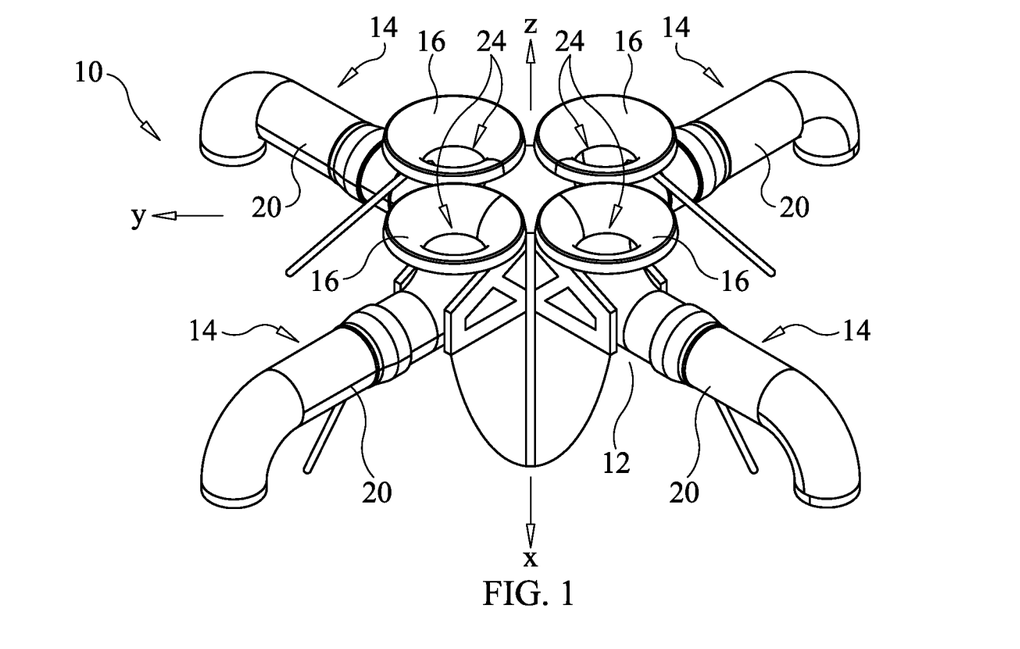
FIG. 1 is diagrammatic, perspective view of a bent tube ducted fan drone constructed in accordance with at least one embodiment of the invention.
Figure 2:
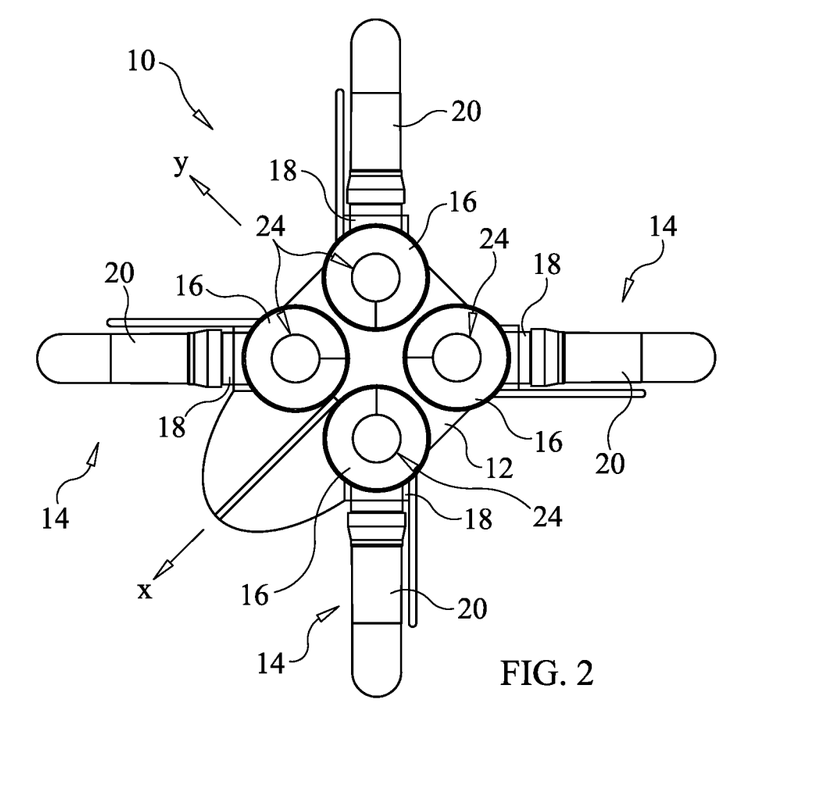
FIG. 2 is a diagrammatic, top view of the bent tube ducted fan drone shown in FIG. 1.
Figures 3, 4:
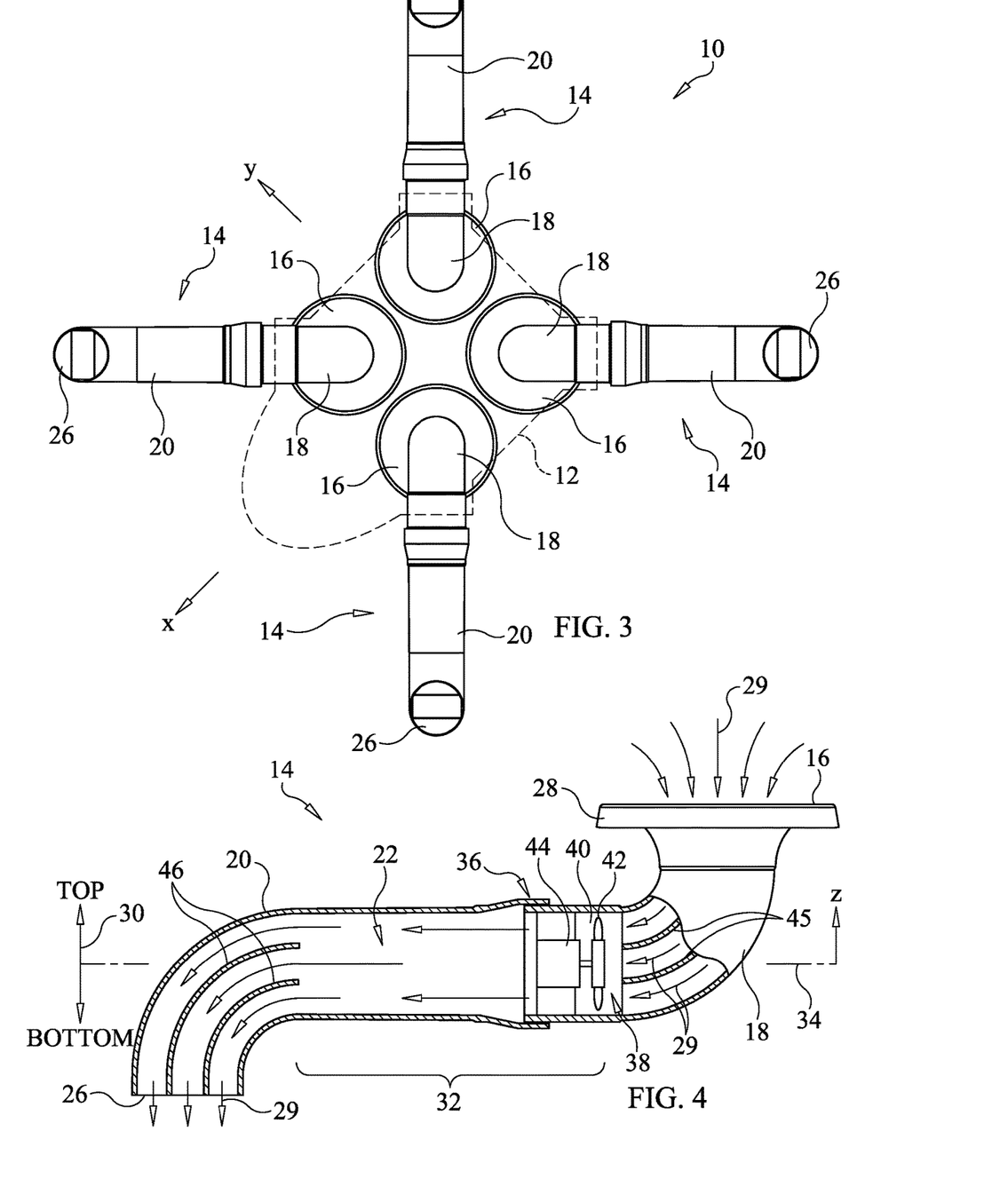
FIG. 3 is a diagrammatic, bottom view of the bent tube ducted fan drone shown in FIG. 1, with a frame of the drone shown in broken line for clarity.
FIG. 4 is a diagrammatic, longitudinal cross-sectional view of a bent tube propulsor in accordance with at least one embodiment of the invention.

With reference to FIGS. 1-3 of the drawings, there is schematically illustrated a ducted fan drone 10 in accordance with an embodiment of the invention. The drone 10 includes a frame 12, shown in broken line in FIG. 3 for clarity. Preferably, frame 12 is constructed of one or more lightweight materials, such as plastic, carbon fiber, other lightweight synthetic material, aluminum, titanium, lightweight allows or other lightweight metal materials, for example. The shape and structure of the frame 12 is not important to understand the embodiments of the present invention. Accordingly, it should be appreciated that frame 12 is only representatively shown and the frame may have other shapes, forms, or constructions as desired.

As depicted, in this representative embodiment, drone 10 includes a plurality of bent tube propulsors 14 that are attached to and supported by the frame 12. Each propulsor 14 is a pipe-like tubular structure through which air is forced to flow by a powered fan disposed within the propulsor to provide lift and thrust force to the drone 10. Preferably, bent tube propulsors 14 are constructed of one or more lightweight materials, such as plastic, carbon fiber, other lightweight synthetic material.

With continued reference to FIGS. 1-3 and additional reference to FIG. 4, each propulsor 14 has an air intake cone 16, an air intake tube portion 18, an exhaust tube portion 20, and an internal air passage 22. The air intake cone 16, the air intake tube portion 18 and the exhaust tube portion 20 are connected in series, respectively. The air intake cone 16 and the air intake tube portion 18 may be integrally formed as a single piece or comprised of separate pieces that are connectable.

The air intake cone 16 defines an air inlet 24 into the air passage 22 and the exhaust tube portion 20 defines an air exit or air nozzle 26 out of the air passage. The air intake cone 16 is disposed on the topside of the drone 10 and can have a lip 28 and a curvature to create lift when air 29 is drawn across the cone and into the air inlet 24. Air nozzle 26 is disposed at the bottom side of the drone 10 and is arranged to discharge air in a general downwardly direction along the drone's vertical axis 30. In the representatively depicted embodiment, the bent tube propulsors 14 are arranged with the air exits 26 disposed in a quadrant fashion like a quadcopter configuration.

With continued reference to FIGS. 1-4, each propulsor 14 further includes a horizontal tube section 32 that extends generally along the drone's longitudinal axis 34. A portion of the horizontal tube section 32 can be defined by an upstream end of the exhaust tube portion 20 and a downstream end of the air intake tube portion 18, which are connected at joint 36. The downstream end of the air intake tube portion 18 defines a motor cavity 38 that is configured to removably receive a fan propulsor 40 therein. The fan propulsor 40 has a fan blade 42 that is operatively connected to a motor 44. The motor 44 is operated to drive the fan blade 42 to draw air 29 across the air intake cone 16, into the air inlet 24, through the air passage 22 and out of the air exit 26, thereby providing lift and thrust force to the drone 10.

As further depicted, one or more turning vanes 45 may be positioned within the air passage 22 and extend along a length of the air passage between the fan propulsor 40 and the air inlet 24. One or more turning vanes 46 may be positioned within the air passage 22 and extend along a length of the air passage 22 between the fan propulsor 40 and the air exit. Turning vanes 45 and 46 may be formed integrally with the air exhaust tube portion 20 or may be configured to be removably inserted into air exhaust tube portion. Turning vanes 45 help to direct air flow through the air passage 22 from the air inlet 24, around the upward bend and to the fan propulsor 40. Similarly, turning vanes 46 help to direct air flow through the air passage 22 from the fan propulsor 40, around the downward bend, and to the air exit 26.

Positioning the fan propulsor 40 within and along the horizontal tube section 32 is an important aspect of embodiments of the invention. Such an arrangement enshrouds the fan blade 42 in such manner that during operation, the blade 42 is entirely prevented from contact with external objects. This arrangement provides a level of safety to drone operation that has never been achieved heretofore. When operating drone 10, and particularly within confined spaces, there is no risk of the fan blade 42 contacting external objects, thereby removing risk of injury and damage to people, animals, objects, and the drone itself that otherwise is present in conventional drone constructions.

To prevent fingers and other bodily parts from inadvertent contact with the fan blade 42 when handling the drone 10, preferably, a center-line length of the intake tube portion 18 as measured from the air inlet 24 to the fan blade 42 is greater than the diameter of the fan blade 42, and a center-line length of the air exhaust tube portion 20 as measured from the air exit 26 to fan blade is greater than the diameter of the fan blade. Turning vanes 45 and 46 also help prevent fingers from entering the air inlet 24 and air exit 26 and contacting the fan blade 42.

Figure 5:
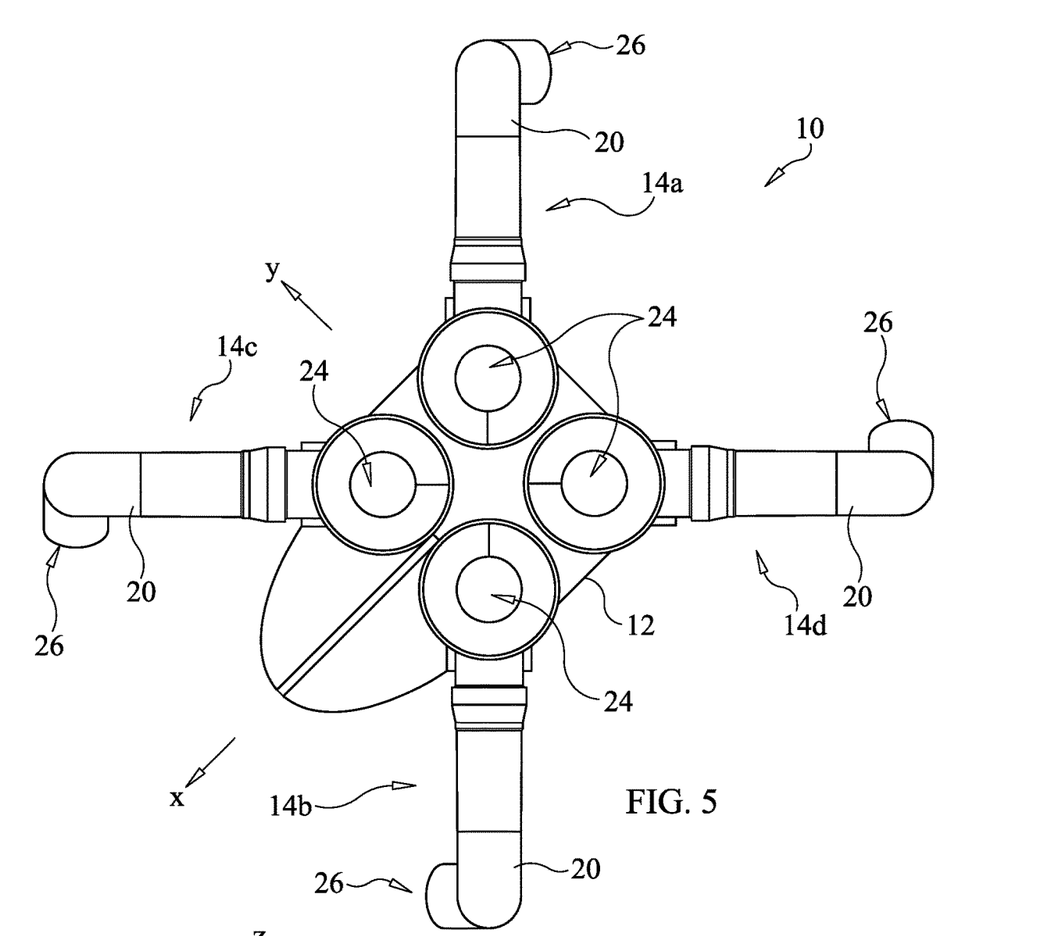
FIG. 5 is a diagrammatic is a diagrammatic, top view of a bent tube ducted fan drone in accordance with at least one embodiment of the invention.
Figure 6:
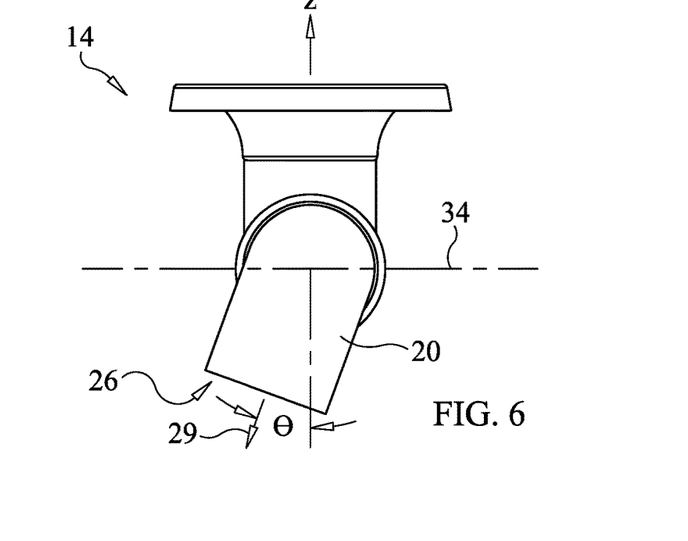
FIG. 6 is a diagrammatic, end view of a bent tube propulsor of FIG. 5.

Turning to FIGS. 5 and 6, in embodiments, the bent tube propulsors 14 can be configured with air exits 26 pitched relative to the Z-axis or vertical axis so that flow of air exiting the air exits can be controlled in a manner to provide YAW torque about the Z-axis. As shown, bent tube propulsors 14a and 14b are configured with air exists 26 pitched to provide a YAW torque about the Z-axis in a counter clockwise direction relative to the view. And bent tube propulsors 14c and 14d are configured with air exits 26 pitched to provide a YAW torque about the Z-axis in a clockwise direction relative to the view.

In this manner, two air exits 26 are angled to produce a lateral component of force so that combined they produce a net YAW torque in one direction (+/−Z), and the other two air exits 26 ducts, in a quad configuration, are angled to produce a YAW torque in the opposite direction of the previous two air exits. This allows YAW control in both directions. By choosing the angles in way that produces the same YAW torque as would be commanded by a conventional propeller powered drone, the control logic used to control a conventional drone can be preserved. The difference is that the YAW torque is being produced by the thrust vector direction of air exiting air exits 26 in drone 10, whereas YAW toque is produced by a combination of motor torque reaction and propeller drag torque to produce the YAW torque in a conventional drone.

Additionally, all fan blades 42 of fan propulsors 40 propellers rotate either clockwise or counterclockwise. This results in a torque neutral system that does not require active YAW, Pitch, or Roll compensation to maintain altitude. This contrasts with a conventional propeller driven drone with motor axes pointed in the Z direction. For such drones, opposing pair of motors must rotate in the same direction, but opposite in direction to the other opposing pair of motors to create a torque neutral system. In this conventional configuration, differential throttling of opposing motor pairs is used to produce YAW control in the +/−Z direction. Advantageously, the configuration of drone 10 allows conventional control logic to be used with no change other than simple gain settings based on the physical size of the drone.

Figure 7:
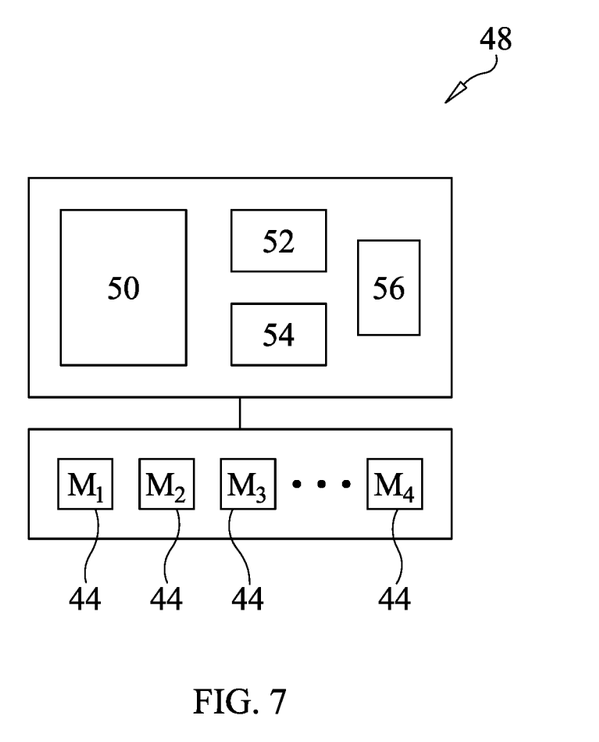
FIG. 7 is a block diagram of an example flight control circuitry.

With reference to FIG. 7, drone 10 may include flight control circuitry 48, which typically includes a CPU 50, inertial measurement unit 52, a data storage 54, and a wireless data transceiver 56 to execute one or more flight control and navigational instructions. The flight control circuitry 48 is operatively connected to the motor 44 of the fan propulsor 40 of each bent tube propulsor 14 to adjust motor speed, and thus, the thrust and lift vector force of each bent tube propulsor to control altitude, pitch, roll, and yaw of the drone 10. While not shown, the control circuitry 48 may be operatively connected to any number of servos to control various other functions as desired. Additionally, while not shown, the control circuit may include or have connected thereto any number of sensors, a GPS receiver, a compass, an altimeter, one or more accelerometers, one or more gyroscopes, or other equipment as desired to aid flight and navigation control of the drone 10.

Figure 8:
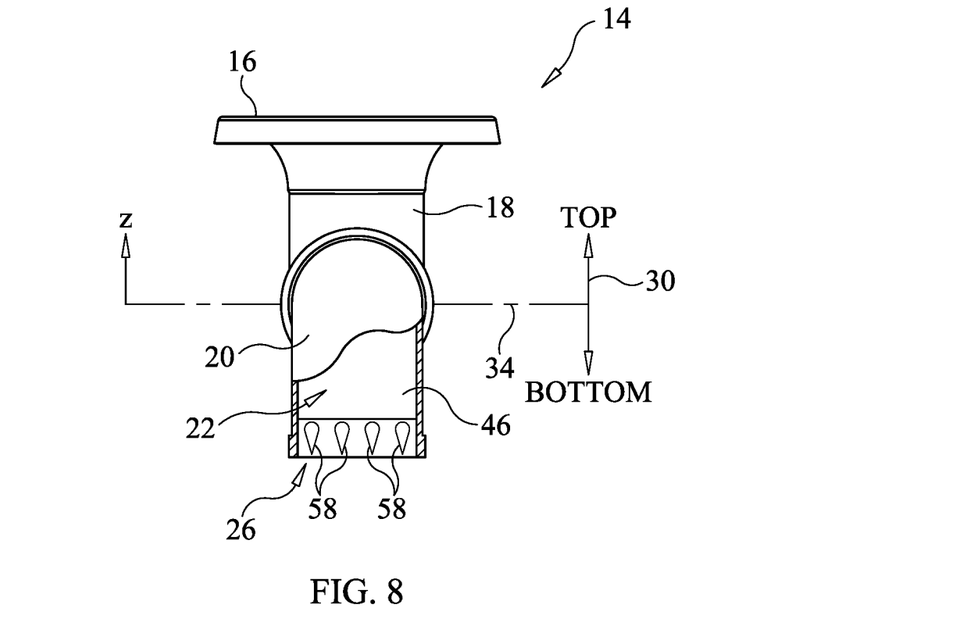
FIG. 8 is a diagrammatic, end view of a bent tube propulsor in accordance with an embodiment of the invention, showing pivotal vanes for thrust vectoring.

With reference to FIG. 8, in embodiments, vanes 58 may be installed across the air exit 26 of the bent tube propulsor 14. Vanes 58 may be configured to pivot to adjust the thrust force vector of the exiting air to aid in flight control, for example, in YAW control of the drone 10. While not shown, vanes 58 are operatively connected to one or more servos that may be operatively connected to the flight control circuitry 48 to adjust the pitch of the vanes relative to the direction of airflow exiting the air exit 26 (i.e., relative to the vertical axis 30 of the drone).

Figure 9:
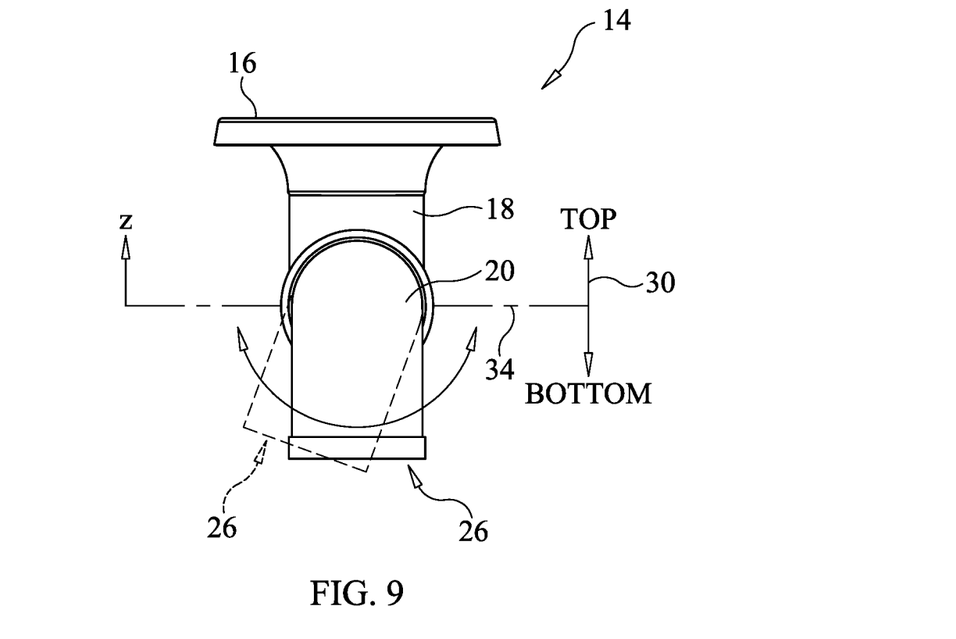
FIG. 9 is a diagrammatic, end view of a bent tube propulsor in accordance with an embodiment of the invention, showing a downwardly bent portion of the bent tube propulsor being rotatable to adjust thrust vectoring.

With reference to FIG. 9, in embodiments, the exhaust tube portion 20 or a down stream end of the tube portion may be configured to rotate to pitch the air exit 26 relative to the vertical axis 30 of the drone 10 to aid in flight control, for example, in YAW control of the drone 10. While not shown, one or more servos or other control elements are operatively connected to the rotatable section of the bent tube propulsor 14 to rotate the section to adjust pitch of the air exit 26.

Additionally, such servo or control element may be operatively connected to the flight control circuitry 48 for operation.

In embodiments, it is contemplated the exhaust tube portion 20 may be rotated to pitch the air exit 26 to direct a main thrust vector to produce a net thrust in the horizontal axis 34 of the drone. This can be used to transition the drone 10 into a forward flight with additional lifting surfaces to compensate for reduction in thrust force in the Z-axis or vertical axis resulting from rotating the exhaust tube portion. The additionally lifting surfaces, such as wings, will produce lift as the drone transitions to forward flight.

Figure 10:
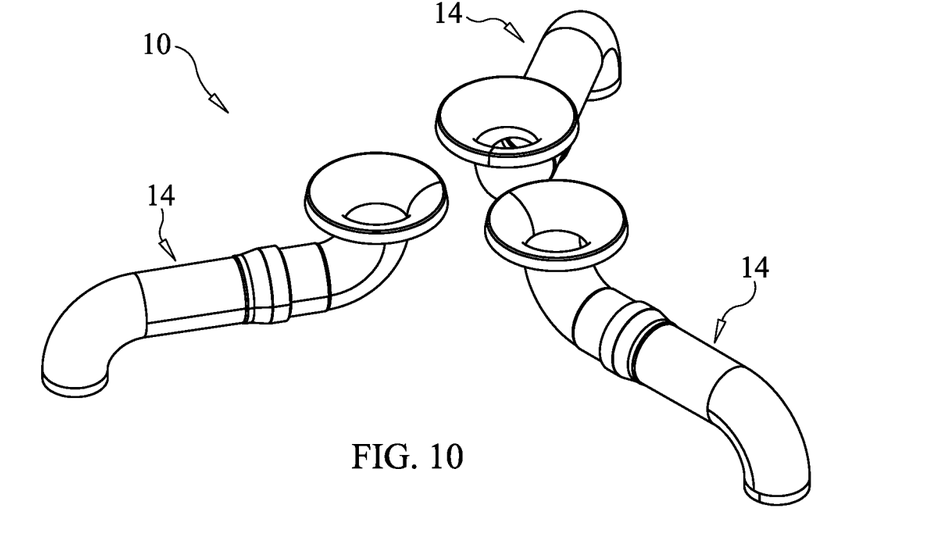
FIG. 10 is diagrammatic, perspective view of a bent tube ducted fan drone constructed in accordance with an embodiment of the invention, shown with three bent tube propulsors and without the frame for clarity.
Figure 11:
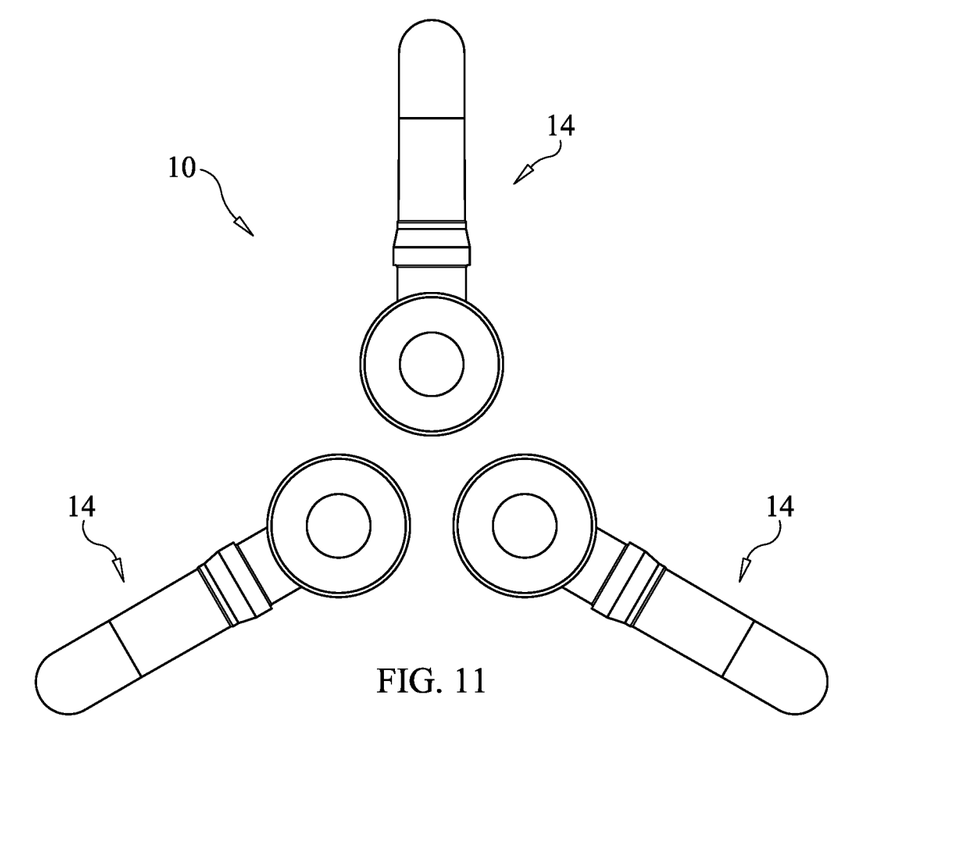
FIG. 11 is a diagrammatic, top view of the bent tube ducted fan drone shown in FIG. 8.
Figure 12:
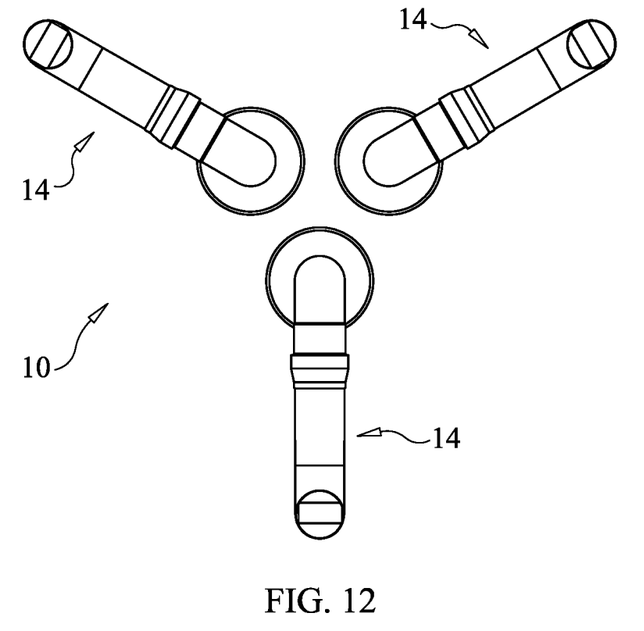
FIG. 12 is a diagrammatic, bottom view of the bent tube ducted fan drone shown in FIG. 8.

In embodiments, drone 10 may have fewer or more bent tube propulsors. For example, in FIGS. 8-10, drone 10 has three bent tube propulsors 14 (the frame 12 not shown for clarity). In this configuration, YAW control may be performed by using a method such as described above in connection with FIGS. 8 and 9.

Figure 13:
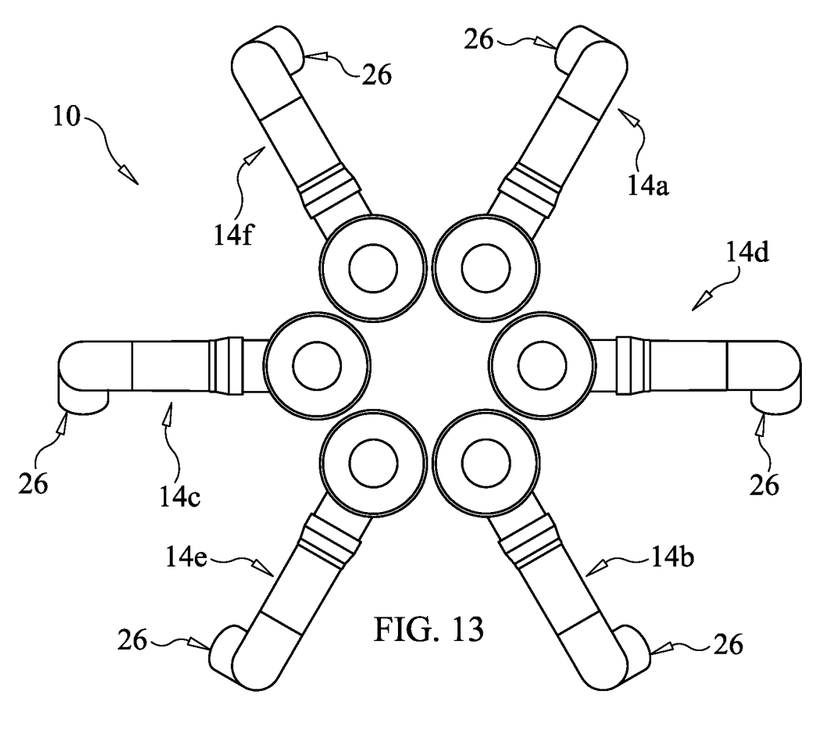
FIG. 13 is diagrammatic, top view of a bent tube ducted fan drone constructed in accordance with at least one embodiment of the invention, shown with six bent tube propulsors and without the frame for clarity.
Figure 14:
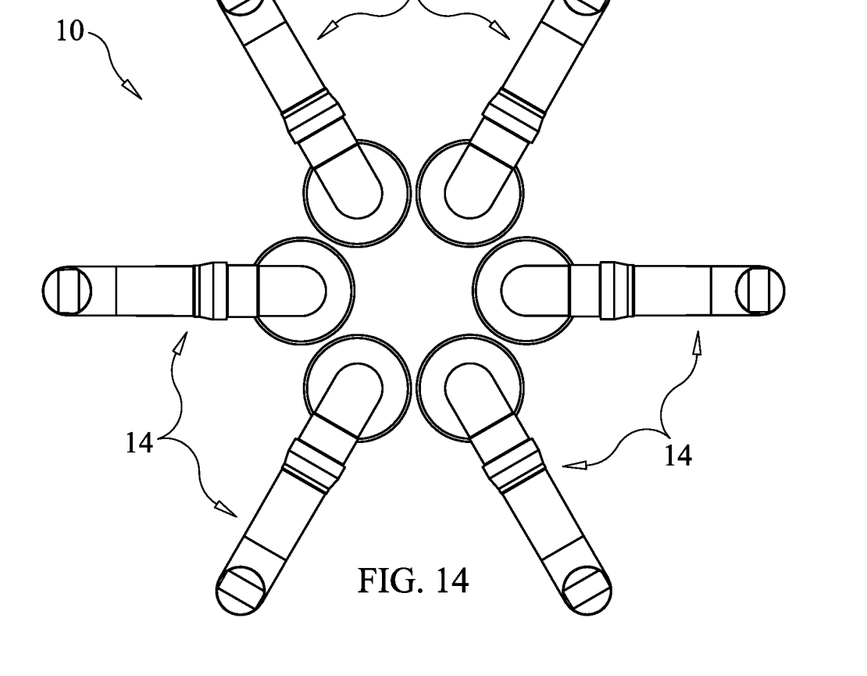
FIG. 14 is a diagrammatic, bottom view of the bent tube ducted fan drone shown in FIG. 11.
Figure 15:
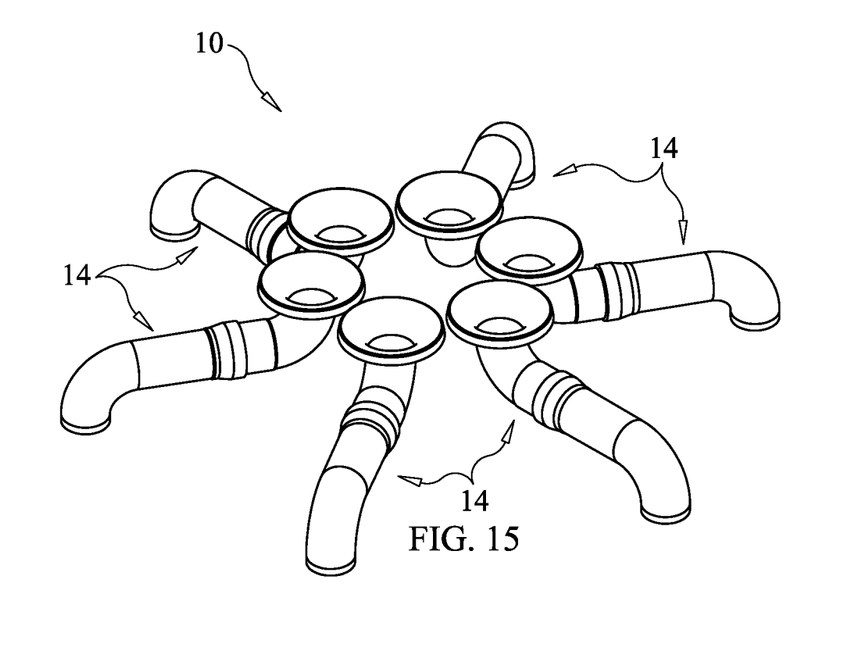
FIG. 15 is a diagrammatic, perspective view of the bent tube ducted fan drone shown in FIG. 11.

In another example, in FIGS. 13-15, drone 10 has six bent tube propulsors (the frame 12 not shown for clarity). In this configuration, YAW control may be performed by any of the above described structure and associated methods. For example, as shown, in FIG. 13 bent tube propulsors 14a, 14b, and 14c are configured with their air exits 26 to produce a YAW torque in a first direction about the Z-axis, and bent tube propulsors 14d, 14e, and 14f are configured with their air exits 26 to produce a YAW torque in an opposite direction about the Z-axis. This configuration is arranged and operates substantially the same as the embodiment described above in connection with FIGS. 5 and 6.

Figure 16:
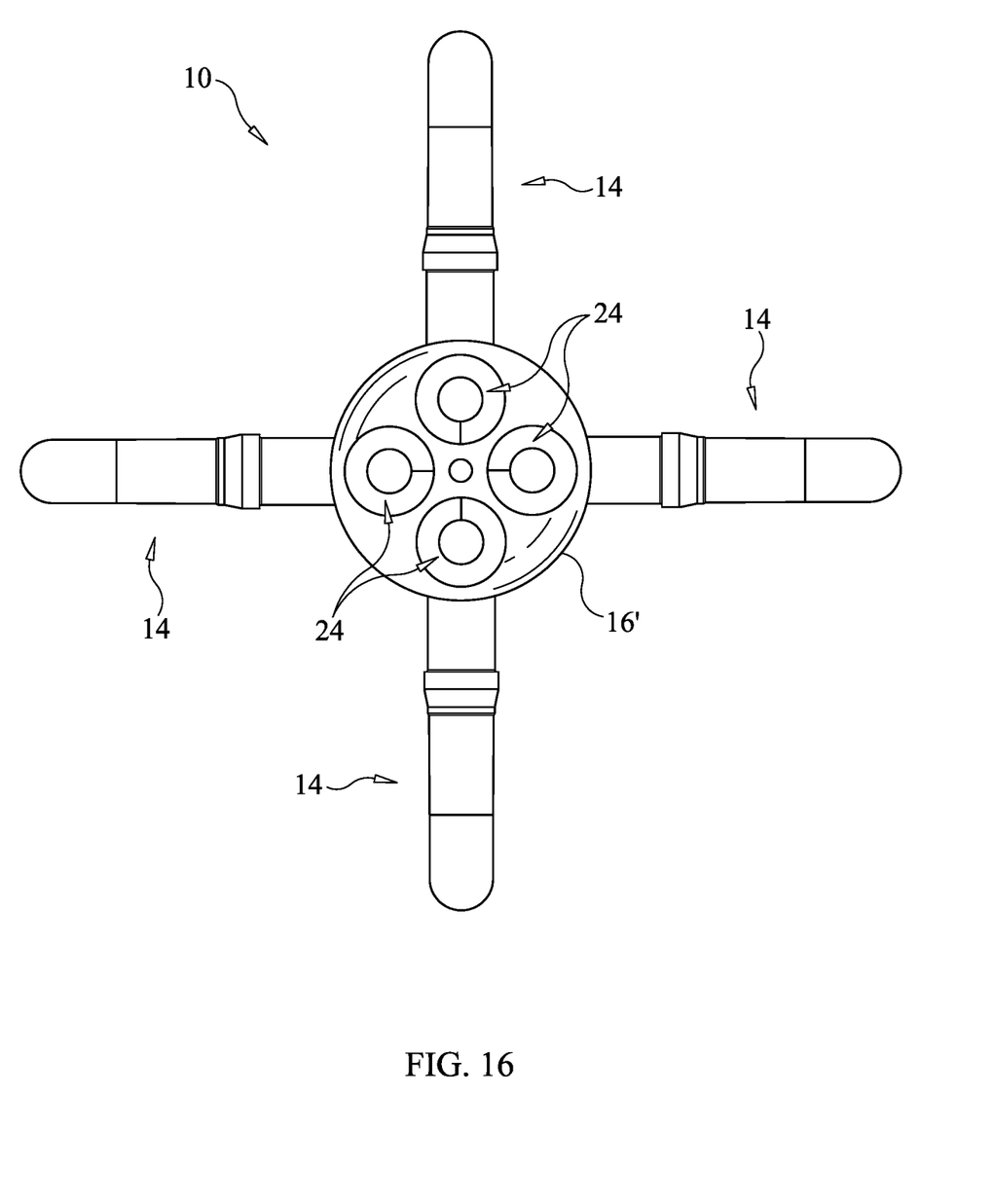
FIG. 16 is a diagrammatic, top view of a bent tube ducted fan drone in accordance with at least one embodiment of the invention
Figure 17:
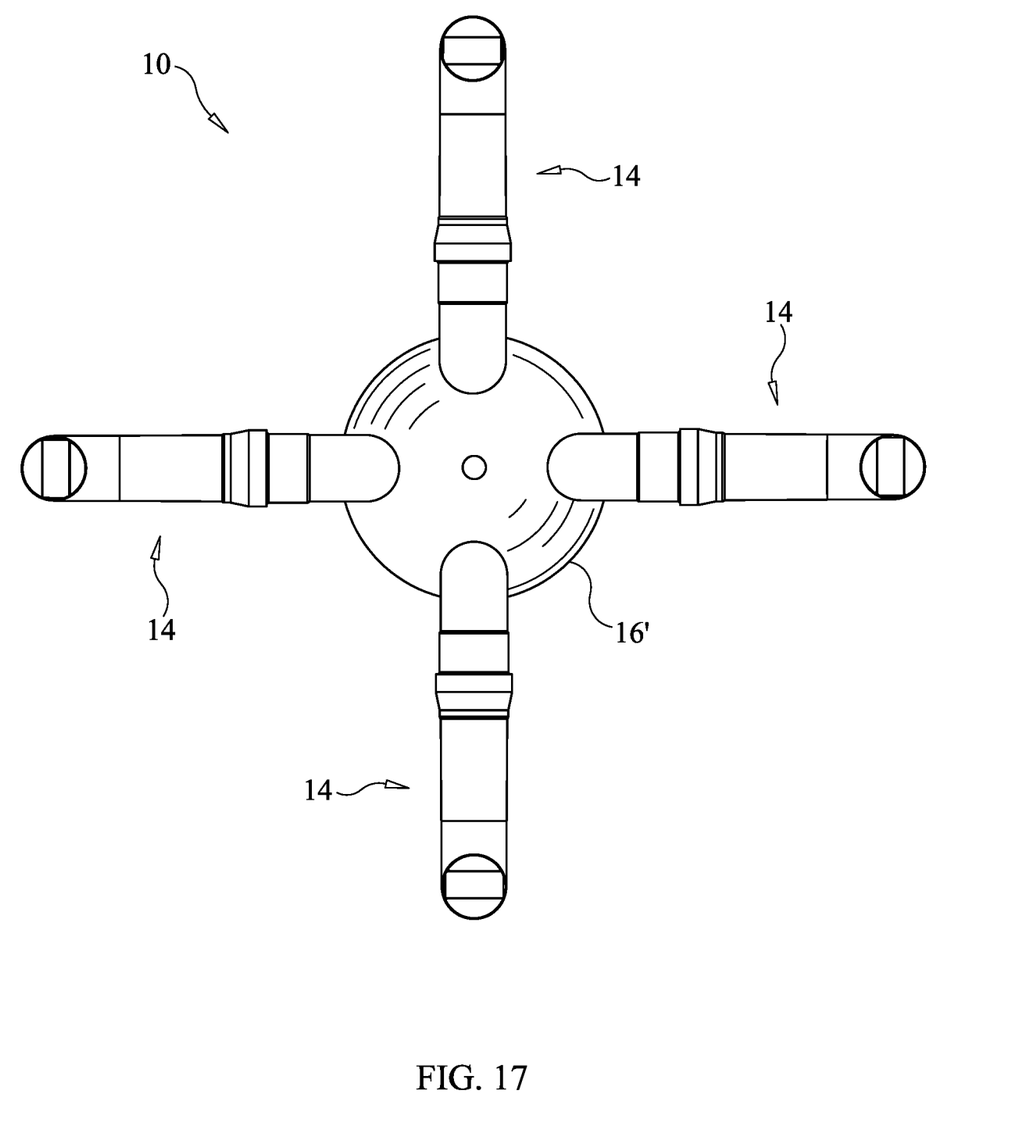
FIG. 17 is a diagrammatic, bottom view of the bent tube ducted drone of FIG. 16.

Turning to FIGS. 16 and 17, in an embodiment, intake cones 16 of the bent tube propulsors 14 may be replaced by a single air intake plenum 16'. In this embodiment, air intake 24 of each bent tube propulsor is connected to the air intake plenum 16' to receive a flow of air therefrom. Air intake plenum 16' is representatively illustrated having a cone shape, similar in shape to air intake cone 16. However, it is important to note that air intake plenum 16' is not limited to this cone shape and could have various other forms as desired.

Several embodiments of the invention have been described. Nevertheless, those skilled in the art, having benefit of this disclosure, will appreciate that various modifications may be made without departing from the spirit and scope of the invention. Accordingly, other embodiments are with the scope of the appended claims.

What is claimed is:

1. A ducted fan drone comprising:
  a frame;
  at least three bent tube propulsors attached to said frame, each of said at least three bent tube propulsors having an air passage, an air inlet into said air passage, and an air exit out of said air passage, said air passage having an upwardly bent portion relative to a longitudinal axis of the ducted fan drone, a downwardly bent portion relative to said longitudinal axis, an a horizontal section extending between said upwardly and downwardly bent portions;
  each of said at least three bent tube propulsors further having a fan propulsor disposed within said air passage at a position along said horizontal section; and
  each air exit of each of said at least three bent tube propulsors being arranged to direct a thrust force to said frame by directing kinetic energy of an airstream flowing out of said air exit in a direction generally downward.

2. The ducted fan drone of claim 1, wherein at least one of said at least three bent tube propulsors has an intake air cone defining said air inlet and having a lip and curvature that provides a lift force when air is drawn across said air intake cone and into said air inlet.

3. The ducted fan drone of claim 1, wherein at least one of said at least three bent tube propulsors has one or more turning vanes located within said air passage to direct air flowing in said air passage around one or both of said upwardly bent portion and said downwardly bent portion of said air passage.

4. The ducted fan drone of claim 1, wherein at least one bent tube propulsor of said at least three bent tube propulsors has first center line length of said air passage as measured from a fan blade of said fan propulsor to said air inlet that is greater than the diameter of said fan blade, and wherein each bent tube propulsor has a second center line length of said air passage as measured from said fan blade of said fan propulsor to said air exit that is greater than the diameter of said fan blade.

5. The ducted fan drone of claim 1, wherein at least one bent tube propulsor of said at least three bent tube propulsors has a plurality of vanes extending across said air exit and being pivotal to adjust their pitch relative to the direction of air exiting said air exit.

6. The ducted fan drone of claim 1, wherein said downwardly bent portion of said air passage of at least one bent tube propulsor of said at least three bent tube propulsors is rotatable to adjust the pitch of said air exit relative to a vertical axis of the ducted fan drone.

7. The ducted fan drone of claim 1, further comprising an air intake plenum, and wherein said air inlet of each air passage is connected to said air intake plenum receive air therefrom.

8. The ducted fan drone of claim 1, wherein the at least three bent tube propulsors comprises at least four bent tube propulsors.

9. The ducted fan drone of claim 8, wherein said at least four bent tube propulsors includes a first group of bent tube propulsors with the bent tube propulsors thereof configured such that their air exits provide a YAW torque in a first direction, and wherein said at least four bent tube propulsors includes a second group of bent tube propulsors with the bent tube propulsors thereof configured such that their air exits provide a YAW torque in a second direction that is opposite of said first direction.

10. The ducted fan drone of claim 9, wherein each fan propulsor has a motor and a fan blade operatively connected to said motor to rotate said fan blade, and wherein the motors of said fan propulsors all rotate in the same direction.

11. The ducted fan drone of claim 9, wherein at least one of said at four bent tube propulsors has one or more turning vanes located within said air passage to direct air flowing in said air passage around one or both of said upwardly bent portion and said downwardly bent portion of said air passage.

12. The ducted fan drone of claim 9, wherein at least one bent tube propulsor of said at least four bent tube propulsors has first center line length of said air passage as measured from a fan blade of said fan propulsor to said air inlet that is greater than the diameter of said fan blade, and wherein each bent tube propulsor has a second center line length of said air passage as measured from said fan blade of said fan propulsor to said air exit that is greater than the diameter of said fan blade.

13. A ducted fan drone comprising:
a frame;
at least three bent tube propulsors attached to said frame, each of said at least three bent tube propulsors comprising:
an air passage, an air intake cone, an air intake tube, and an air exhaust tube, said air intake cone defining an air inlet into said air passage, said air exhaust tube defining an air exit out of said air passage;
said air passage having an upwardly bent portion, relative to a longitudinal axis of the ducted fan drone, defined by said air intake tube, a downwardly bent portion, relative to said longitudinal axis, defined by said air exhaust tube, and a horizontal section defined by one or both of said air intake tube and said air exhaust tube and extending between said upwardly and downwardly bent portions;
said air intake tube having a downstream end connected to an upstream end of said air exhaust tube;
each of said at least three bent tube propulsors further having a fan propulsor disposed within said air passage at a position along said horizontal section; and
each air exit of each of said at least three bent tube propulsors being arranged to direct a thrust force to said frame by directing kinetic energy of an airstream flowing out of said air exit in a direction generally downward.

14. The ducted fan drone of claim 13, wherein said air intake cone of at least one of said at least three bent tube propulsors has a lip and curvature that provides a lift force when air is drawn across said air intake cone and into said air inlet.

15. The ducted fan drone of claim 13, wherein at least one bent tube propulsor of said at least three bent tube propulsors has first center line length of said air passage as measured from a fan blade of said fan propulsor to said air inlet that is greater than the diameter of said fan blade, and wherein each bent tube propulsor has a second center line length of said air passage as measured from said fan blade of said fan propulsor to said air exit that is greater than the diameter of said fan blade.

16. The ducted fan drone of claim 13, wherein at least one of said at three bent tube propulsors has one or more turning vanes located within said air passage to direct air flowing in said air passage around one or both of said upwardly bent portion and said downwardly bent portion of said air passage.

17. The ducted fan drone of claim 13, wherein said downwardly bent portion of said air passage of at least one bent tube propulsor of said at least three bent tube propulsors is rotatable to adjust the pitch of said air exit relative to a vertical axis of the ducted fan drone.

18. The ducted fan drone of claim 13, wherein the at least three bent tube propulsors comprises at least four bent tube propulsors.

19. The ducted fan drone of claim 18, wherein said at least four bent tube propulsors includes a first a first group of bent tube propulsors with the bent tube propulsors thereof configured such that their air exits provide a YAW torque in a first direction, and wherein said at least four bent tube propulsors includes a second group of bent tube propulsors with the bent tube propulsors thereof configured such that their air exits provide a YAW torque in a second direction that is opposite of said first direction;
wherein each fan propulsor has a motor and a fan blade operatively connected to said motor to rotate said fan blade, and wherein the motors of said fan propulsors all rotate in the same direction; and wherein at least one of said at four bent tube propulsors has one or more turning vanes located within said air passage to direct air flowing in said air passage around one or both of said upwardly bent portion and said downwardly bent portion of said air passage.

20. The ducted fan drone of claim 19, wherein at least one bent tube propulsor of said at least four bent tube propulsors has first center line length of said air passage as measured from a fan blade of said fan propulsor to said air inlet that is greater than the diameter of said fan blade, and wherein each bent tube propulsor has a second center line length of said air passage as measured from said fan blade of said fan propulsor to said air exit that is greater than the diameter of said fan blade.

* * * * *